J. M. BAIRD.
Water Cooler.
No. 55,037.
Patented May 29, 1866.
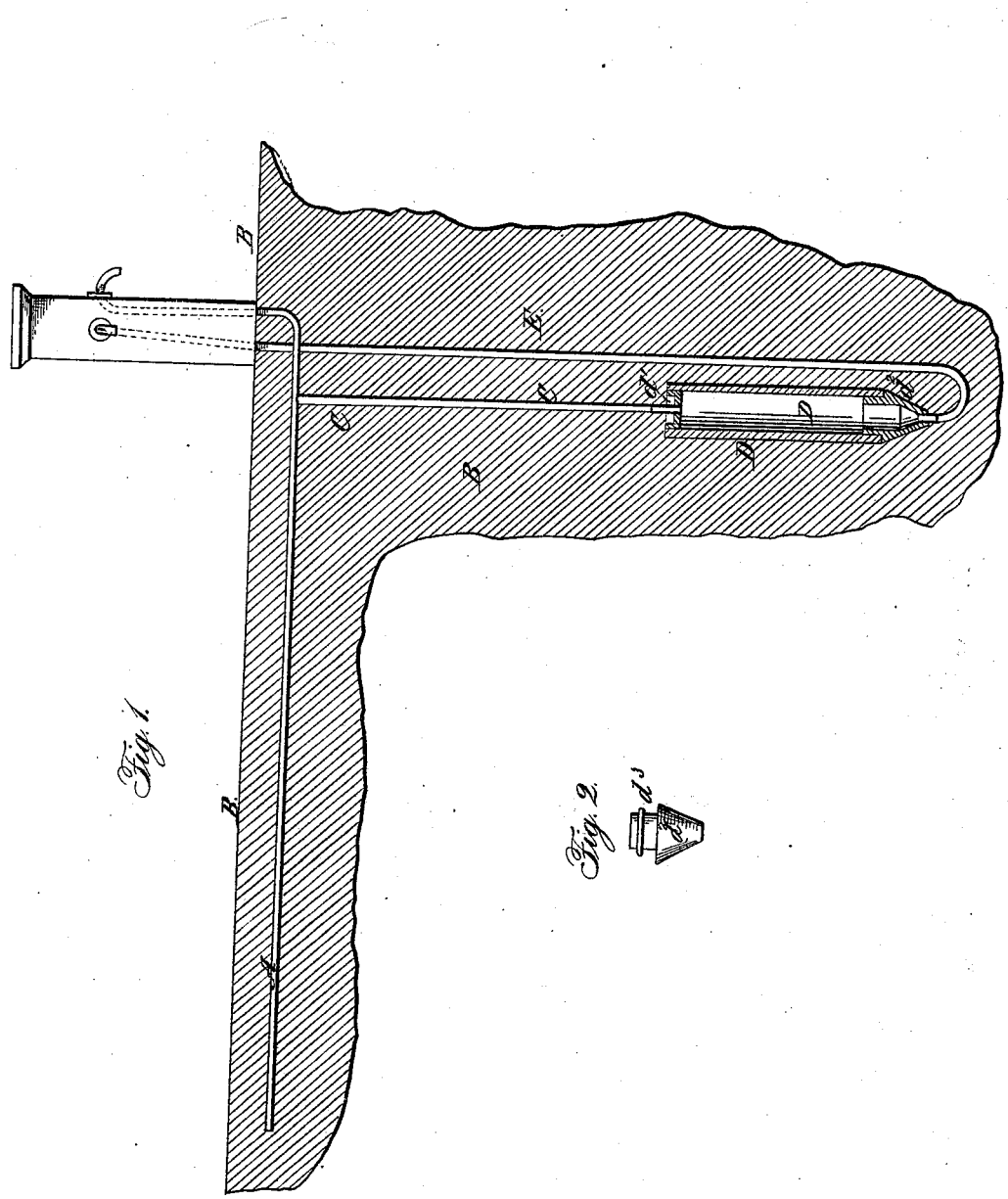

UNITED STATES PATENT OFFICE.

J. M. BAIRD, OF WHEELING, WEST VIRGINIA.

WATER COOLER AND PURIFIER.

Specification forming part of Letters Patent No. 55,037, dated May 29, 1866.

*To all whom it may concern:*

Be it known that I, J. M. BAIRD, of Wheeling, Ohio county, State of West Virginia, have invented a new and Improved Water Cooler and Purifier; and I do hereby declare that the following is a full, clear, and exact description thereof, which will enable others skilled in the art to make and use the same, reference being had to the accompanying drawings, forming part of this specification, in which—

Figure 1 is a side view of my improved apparatus, partly in section, through the purifying and cooling tank. Fig. 2 is a side view of a modification of the lower end or head of the tank.

Similar letters of reference indicate like parts.

My invention is based upon the three following facts: first, that the temperature of the earth a few feet below the surface is about the same at all seasons of the year; second, that in all bodies of water the coldest portion is that nearest the bottom; and third, that when water is at rest the sediment contained in it settles to the bottom.

It has for its object to furnish an apparatus for cooling and purifying water, so that it may be at all seasons of the year not only pure but agreeable to the taste; and it consists of a tank constructed and arranged as hereinafter described, in connection with the induction and discharging pipes.

A is an ordinary hydrant water-pipe, which is laid a short distance below the surface of the ground B in the usual manner. With this pipe, at a point a short distance from the place where the water is desired to be used, is connected the induction-pipe C. This pipe passes down a few feet into the ground, so that it may not be materially affected by changes of temperature. There it connects with the cooling and purifying tank D. This tank may be made of iron, copper, wood, or any other suitable material. It may be of any size, but its length should always be at least four times its diameter, and it should be placed perpendicularly in the ground, as shown.

The top or head $d'$ of the tank D, with which the induction-pipe C is connected, should be made of metal, and when the tank D is metallic it may be made and attached in the ordinary way; but when the tank D is made of staves the edge of the head should be made with a tongue to fit into a groove in the staves in the manner of a barrel-head. The bottom head or end, $d^2$, should also be metallic, should be cone or funnel shaped, and should be attached to the tank D, in the manner before described with reference to the head $d'$. When the tank is wooden the head $d^2$ should also have a tongue, $d^3$, for fitting into a groove in the staves, as before described.

The discharging-pipe E is connected to the apex of the cone-shaped head $d^2$, as shown in Fig. 1, and passes thence to the point where the water is required for use in the ordinary manner.

When the water has been allowed to stand a short time in the tank D it becomes cool, and the sediment all settles to the bottom into the funnel-shaped part of the head $d^2$. Then when the water is drawn off the first effect is to force the sediment, by the weight and pressure of the water, through the pipe E, (the apparatus thus clearing itself,) after which the clear and cold water flows out.

The pipe A itself may be bent down and connected to the head $d'$ of the tank D, if desired, thus forcing all the water to pass through the apparatus; but I prefer the construction first described, as it allows the ordinary hydrant-water to be drawn off without disturbing the water in the tank D.

I have described the apparatus as being used in connection with hydrant-water only; but it may be used in connection with pumps or springs, or for other uses.

I claim as new and desire to secure by Letters Patent—

A water cooler and purifier formed by combining the tank D, constructed and arranged as herein described, with the induction and discharging pipes C and E, substantially as and for the purpose set forth.

J. M. BAIRD.

Witnesses:
JOSEPH WILLETTS,
WM. J. GOSHORN.